(12) United States Patent
de Souza et al.

(10) Patent No.: US 9,576,250 B2
(45) Date of Patent: Feb. 21, 2017

(54) METHOD AND SYSTEM FOR SIMULATING USERS IN THE CONTEXT OF A PARKING LOT BASED ON THE AUTOMATIC LEARNING OF A USER CHOICE DECISION FUNCTION FROM HISTORICAL DATA CONSIDERING MULTIPLE USER BEHAVIOR PROFILES

(71) Applicant: Xerox Corporation, Norwalk, CT (US)

(72) Inventors: Cesar Roberto de Souza, Grenoble (FI); Frederic Roulland, Le Versoud (FR); Victor Ciriza, Saint Martin d'Uriage (FR)

(73) Assignee: Xerox Corporation, Norwalk, CT (US)

( * ) Notice: Subject to any disclaimer, the term of this patent is extended or adjusted under 35 U.S.C. 154(b) by 78 days.

(21) Appl. No.: 14/630,227

(22) Filed: Feb. 24, 2015

(65) Prior Publication Data
US 2016/0247326 A1 Aug. 25, 2016

(51) Int. Cl.
| | |
|---|---|
| *G07B 15/02* | (2011.01) |
| *G06N 99/00* | (2010.01) |
| *H04L 29/08* | (2006.01) |
| *G06Q 10/06* | (2012.01) |
| *G06Q 10/04* | (2012.01) |

(52) U.S. Cl.
CPC .......... *G06N 99/005* (2013.01); *G06Q 10/04* (2013.01); *G06Q 10/067* (2013.01); *H04L 67/306* (2013.01)

(58) Field of Classification Search
CPC .......... G07B 15/02; G07F 17/24; G06Q 20/00
USPC .......... 235/376, 380, 383, 384, 385
See application file for complete search history.

(56) References Cited

U.S. PATENT DOCUMENTS

| | | | |
|---|---|---|---|
| 5,946,675 A | 8/1999 | Sutton | |
| 6,816,085 B1 | 11/2004 | Haynes et al. | |
| 7,181,409 B1 * | 2/2007 | Murakami | B60L 11/1816 705/5 |
| 7,181,426 B2 | 2/2007 | Dutta | |
| 7,370,023 B1 | 5/2008 | Forsythe et al. | |
| 7,739,167 B2 | 6/2010 | Breen et al. | |

(Continued)

OTHER PUBLICATIONS

Cameron, A. C. et al., Microeconometrics Using Stata (2009) StataCorp, LP, Stata Press, College Station, TX, 732 pages.

(Continued)

*Primary Examiner* — Daniel St Cyr
(74) *Attorney, Agent, or Firm* — Kermit D. Lopez; Luis M. Ortiz; Ortiz & Lopez, PLLC

(57) ABSTRACT

Methods and systems for modeling user arrival and choice in the context of off-street parking solutions. A first component models the arrival and duration of stay of users as a function of time, taking into account different user profiles (or "clusters"), captured by a latent variable. A second component provides a ranking function (for each user cluster), wherein the input features describing the "choice" constitute status variables associated different car park(s), and the output constitutes a preferred car park and a pricing scheme. The system simulates different user behaviors by assuming some standard groups of users will behave similarly. Groups of users or user profiles are learned automatically. The profiles are then employed as a key element for automatically learning a decision function of parking users, and automatically learning one decision function per profile.

20 Claims, 12 Drawing Sheets

(56) References Cited

U.S. PATENT DOCUMENTS

| | | |
|---|---|---|
| 8,189,905 B2 | 5/2012 | Eaton et al. |
| 8,368,558 B2 | 2/2013 | Nagase |
| 8,812,355 B2 * | 8/2014 | Angell .................. G06Q 30/02 705/14.25 |
| 9,087,314 B2 * | 7/2015 | Hoffman .............. G06Q 10/087 |
| 2006/0212344 A1 * | 9/2006 | Marcus ................. G07B 15/02 705/13 |
| 2008/0291054 A1 * | 11/2008 | Groft ................ G06Q 30/0284 340/932.2 |
| 2012/0245981 A1 * | 9/2012 | Volz ...................... G07B 15/02 705/13 |
| 2013/0113936 A1 | 5/2013 | Cohen et al. |
| 2013/0258107 A1 | 10/2013 | Delibaltov et al. |
| 2014/0003710 A1 | 1/2014 | Seow et al. |
| 2014/0046874 A1 | 2/2014 | Li et al. |
| 2014/0072206 A1 | 3/2014 | Eaton et al. |

OTHER PUBLICATIONS

Soehodho, S., "Predicting the Probability of Parking Vehicle Based on Dynamic Simulation," Journal of the Eastern Asia Society for Transportation Studies (1999) 3(3):233-245.

Dieussaert, K. et al., "Sustapark: An Agent-based Model for Simulating Parking Search," 12th AGILE International Conference on Geographic Information Science (2009) Leibniz Universitat Hannover, Germany, 11 pages.

Tatsumi, H., "Modeling of Parking Lot Choice Behavior for Traffic Simulation," Journal of the Eastern Asia Society for Transportation Studies (2003) 5:2077-2091.

Wariach, R. A. et al., "Optimizing Parking Prices Using an Agent Based Approach,"Eidgenbssische Technische Hochschulearich, IVT, Institute for Transport Planning and Systems (2012). http://dx.doi.org/10.3929/ethz-a-007340031.

* cited by examiner

METHOD AND SYSTEM FOR SIMULATING USERS IN THE CONTEXT OF A PARKING LOT BASED ON THE AUTOMATIC LEARNING OF A USER CHOICE DECISION FUNCTION FROM HISTORICAL DATA CONSIDERING MULTIPLE USER BEHAVIOR PROFILES

TECHNICAL FIELD

Embodiments are generally related to parking management systems. Embodiments are additionally related to the management of off-street parking. Embodiments also relate to computer simulations, machine learning, and the analysis of parking user behavior in the context of parking management systems.

BACKGROUND OF THE INVENTION

Parking areas such as parking garages and parking lots are used at various locations, ranging from shopping malls to airports. A particular aspect of parking areas involves off-street parking and the management of parking users, costs, and revenue. In a number of off-street parking situations, it is desirable to optimize a given characteristic of measure from an off-street parking area. Such a characteristic may be, for example, the overall revenue of the parking area or lot. Currently, all that is available is historical data from the parking lot or area itself, such as records of user arrival and leave times, in addition to some information about the parking lot infrastructure. It would be desirable to know in advance what would happen if a parking area (e.g., a parking zone, parking lot, etc.) is open, closed, or some of its characteristics (e.g., current price rates, average time distance from points of interest) have changed.

Several highly specialized approaches have been proposed to model parking user demand. One model, for example, is an agent-based system that can simulate parking and traffic situations under different parking management conditions in the context of an entire city. In this system, the number of agents operating inside the city was roughly estimated from a travel survey and was further tuned by running the model several times after gradually reducing the number of agents at each time. The parking demand was specified for different places by considering different attraction factors per trip motive (e.g., recreation, work, shopping) for each kind of budding (e.g., restaurant, residential or office). Afterwards, the calibration process was performed by asking field experts of the city administration to assess results based on their knowledge.

Simulation models for parking systems have also been proposed. However, when confronted with the specific problem of simulating duration time (e.g., the time a car stays parked in the parking lot), such models have adopted an average duration time for all vehicles within a certain period. Another approach that has been discussed involves designing a parking search model based on a utility maximization theory. This approach, however, is centered on on-street parking or parking lots spread throughout a city. It is not based on learning the user behavior nor on user profiles.

Another related work involves the use of MISIM (a microscopic traffic simulator developed at MIT) to simulate off-street parking and investigate how to create a user-choice model for this task. However, in this work, the author chose to define behavior groups a priori, dividing users into fixed, guided and un-guided. Moreover, a manually-crafted algorithm was used in this case to determine whether a user would chose to park or queue for a new option. In our system, the groups are determined automatically by an unsupervised algorithm. Furthermore, in our system the choice behaviors of each group are learned using a supervised algorithm from the historical data, instead of being manually and rigidly programmed into a computer. Other demand strategies include a regression model, which attempts to estimate parking demand as a parametric formula whose general form has to be specified manually or picked among candidates.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for an improved parking management method and system.

It is another aspect of the disclosed embodiments to provide methods and systems for simulating users in the context of a parking lot based on the automatic learning of the user choice decision function from historical data considering multiple user behavior profiles.

It is yet another aspect of the disclosed embodiments to provide a simulation framework or system composed of a collection of separate modules, each of which can also be employed in a standalone fashion to provide additional information for other parking resources and applications.

It is still another aspect of the disclosed embodiments to provide a micro-simulation that utilizes at least a user-choice module based on a data-driven model (i.e., a model created using machine learning) to simulate how simulated users would behave in the real-world.

The aforementioned aspects and other objectives and advantages can now be achieved as described herein. Methods and systems for modeling user arrival and choice in the context of off-street parking solutions are described herein. A first component models the arrival and duration of stay of users as a function of time, taking into account different user profiles (or "clusters"), captured by a latent variable. A second component provides a ranking function (for each user cluster), wherein the input features describing the "choice" constitute status variables associated different car park(s) and the output constitutes a preferred car park. The system simulates different user behaviors by assuming some standard groups of users will behave similarly. Groups of users or user profiles are learned automatically. The profiles are then employed as a key element for automatically learning a decision function of parking users and automatically learning one decision function per profile.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

The particular values and configurations discussed in these non-limiting examples can be varied and are cited merely to illustrate one or more embodiments and are not intended to limit the scope thereof.

Figure 1:
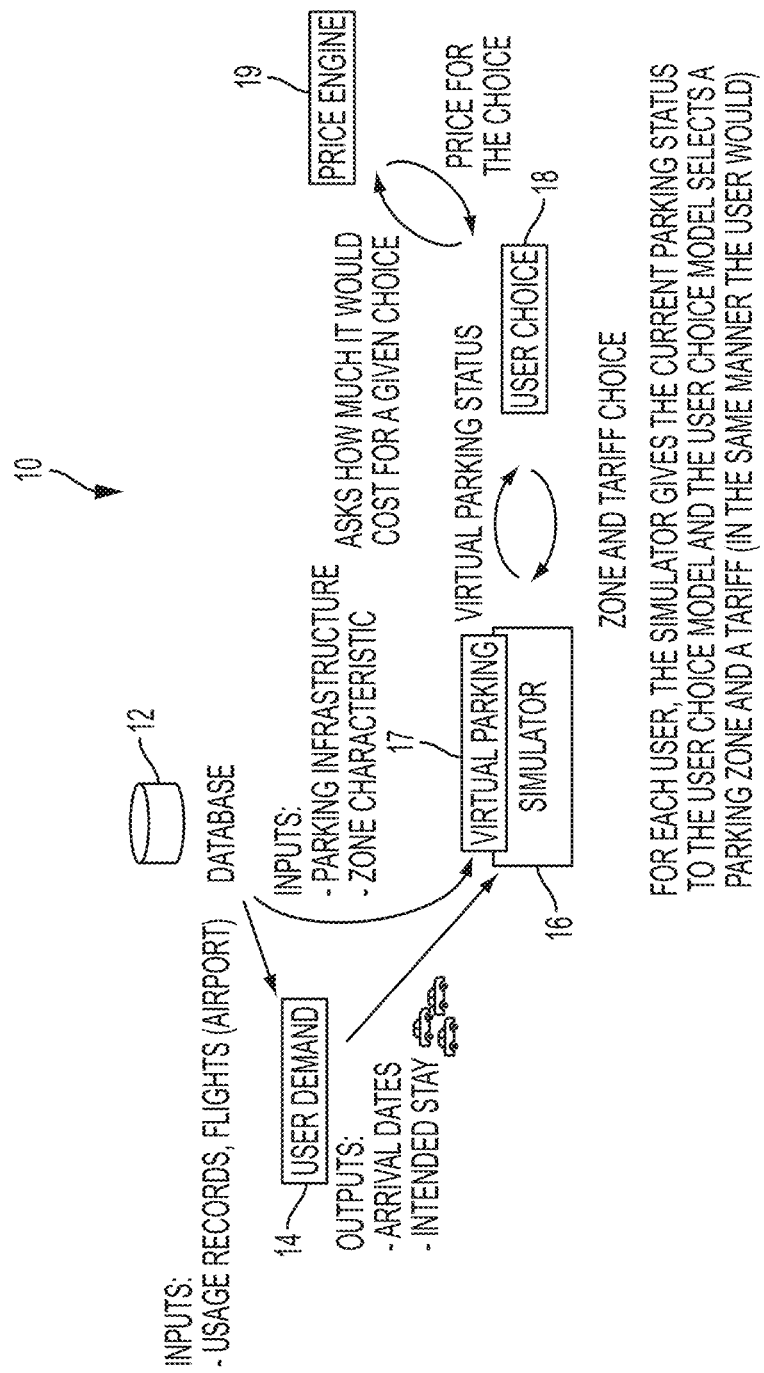
FIG. 1 illustrates a block diagram of a framework of a simulation system, in accordance with a preferred embodiment.

FIG. 1 illustrates a block diagram of the framework of a simulation system 10, in accordance with a preferred embodiment. System 10 generally includes a database 12, a user demand module 14, a simulation module 16 (i.e., a simulator), a user choice module 18, and a price engine module 19 (i.e., referred to also as a "price engine"). The simulation system 10 can be incorporated into a number of applications, such as a parking management system including, for example, a parking revenue optimization tool and can be adapted for use with a decision support platform for adjusting price rates in existing parking lots. The simulation system 10 can also work closely with one or more different analytics platforms and analysis tools to produce a simulated parking environment capable of being visualized and explored through, for example, a standard dashboard interface in the web browser.

System 10 can also present a few user interfaces, which can be used to edit price grids, invoke and test simulations, and produce basic outcome reports comparing the simulated world against the real world. The application framework or system 10 can thus be divided into the aforementioned modules 12, 14, 16, 18, and 19. The simulation module 16 or simulation orchestrator can also work alongside a virtual parking lot 17 (also referred to as "virtual parking"), which is discussed in greater detail herein.

In system 10, everything thus begins or emanates from the database 12. The database 12 contains historical data that can be used to build a user demand model and provide basic infrastructure information for the simulator 16 to build the virtual parking 17. The virtual parking 17 is a model of real parking presenting the same real-world constraints on the capacity of each parking zone and their distances from the central objective building of the parking lot or facility (e.g., parking at an airport).

The user demand module 14 can be configured as an entity that can estimate or guess when a new user is going to arrive at the parking lot. The user demand module 14 can be configured from historical records concerning previous users of the parking facility or parking areas/zones, and, in the case of airports, is also able to use information about the current departing and arriving flights. Afterwards, the user demand module 14 can transmit this information to the simulator 16.

For each of the predicted arrival and duration times obtained from the user demand module 14, the simulator 16 can request a current choice model to guess/estimate regarding which zone this user might want to park and which pricing option this user may desire (i.e., in which pricing zone the user may want to be). The user choice module 18 can be implemented in several ways, such as following a manually programmed behavior or even employing a machine learning model to learn the user behavior. One component, preferably a part of most user choice models, is the price engine 19, which computes how much the user would have to pay in case he or she opts for a particular tariff choice.

The creation of the learning data depends on the reconstruction of the parking events using a simulated parking. For each parking event, the state of the simulated parking can be inspected to re-create features not available from the dataset, such as the parking lot occupancy, the behaviour of users in the past 5 minutes, etc.

In the disclosed embodiments, focus is given on what differentiates system 10 (and any variations to system 10) from standard approaches towards transport-related simulation and revenue simulation. In short, the embodiments focus on how the user choice problem can be cast as a machine learning problem, wherein an attempt is made to replicate the user's line of reason once he or she decides to enter a parking lot. It will be appreciated how new samples can be generated from the historical data so that the disclosed learned models or modules can be applied to new, synthetically generated samples.

In order to further explain how the system 10 functions, an example scenario involving a parking lot can be analyzed. From the history database 12, records can be retrieved which specify, for example, the entrance, exit, and payment details for each user who has ever parked his car in the parking lot. For each of those records, a parking event can be created for the simulation task. Each parking event represents the activity of a user inside the parking lot. One transaction log can be designated with, for example, "user X entered at 24/06/2013 at gate A", while another may designate "user Y left at 25/06/2013 from gate B." Once all parking events are recreated from the database 12, all events can be sorted by the date of occurrence. From this point, each event can be processed, one by one, updating the state of the virtual parking lot 17. At each event, the occupancy of each parking zone is updated. One point to be noted is that this allows for the computation of statistics such as average occupancy, revenue, entry rate, and leave rate can be registered for different time windows (e.g., such as in the past 5 minutes, 15 minutes, one hour).

Furthermore, at each user entrance event, the system 10 enumerates all possible choices the user had. Choices can include opting, for example, for "Zone A, which is 10% full and which is 15 minutes far from the airport, in which I will pay around 42 € for parking for 10 minutes under tariff X," or "Zone B, which is 60% full, in which I will pay around 10 € for parking for 10 minutes under tariff Y." Once all choices are enumerated, the system 10 assigns a positive label to the choice the user had really taken in real life and a negative label for all other possibilities.

At this point in the process, database 12 now includes one or more rows of information concerning the user's status (e.g., date of arrival), intentions (e.g., intended duration of stay), parking status (e.g., live statistics about all parking zones, zone capacity, time distance between zone and target), and future consequences of a choice (e.g., total amount paid). Associated with each row is a label indicating whether or not this choice (or choices) has been accepted. The system 10 is very flexible in the number and nature of features it can handle. The system 10 can evaluate any combination of features, such as, but not restricted to, for example:

Total amount to be paid;
Total amount to be paid, averaged per hour;
Zone occupancy percentage at the date of entrance;
Intended duration of stay;
Hour of arrival at the park;
Intended leave hour;
Day of the week of the arrival;
Intended day of the week for leaving;
Average parking zone occupancy that users from this profile are used to;
Average price paid from users of this profile group;
Average duration users from this profile, group stay;
Parking zone capacity;
Popularity (prevalence) of a parking zone in the user's profile;
Popularity (prevalence) of a parking zone;
Parking zone average occupancy;
Average price paid in the parking zone;
Distance (in minutes) from the parking zone to the point of interest;
Maximum allowed parking minutes advertised for a parking zone;
Current occupancy for each other parking zone in the park;
Average zone occupancy in the last 15 minutes;
Average intended duration of past users in the last 15 minutes;
Distance between the parking lot's entrance and the zone entrance;
Number of initial advertised grace minutes under which parking is free;
An indicator variable regarding whether or not the stay will be free; and
Whether the parking zone is covered or open-air.

Once this process ends, a feature vector database will have been extracted from the original historical data representing user choices separated by different profiles. An example dataset is shown below in Table 1:

TABLE 1

Example User Decision Dataset

| User | User profile | Amount to be paid | Intended duration | Walking minutes to airport | Zone occupancy at arrival | Zone capacity | User decision |
|---|---|---|---|---|---|---|---|
| A | 1 | 75 | 45 | 1 | 90% | 115 | No |
| A | 1 | 3 | 4 | 8 | 20% | 662 | No |
| A | 1 | 15 | 4 | 20 | 10% | 100 | Yes |
| A | 1 | 15 | 45 | 20 | 99% | 220 | No |
| B | 1 | 0 | 5 | 1 | 90% | 115 | Yes |
| B | 1 | 0 | 5 | 8 | 20% | 662 | No |
| B | 1 | 0 | 5 | 20 | 11% | 100 | No |
| B | 1 | 0 | 5 | 20 | 99% | 220 | No |

Note that the current state of the virtual parking 17 at the time the simulated user enters the airport is important for the feature extraction phase. As it can be seen, once a user has decided to enter a particular zone, this zone occupancy status changes for the next user, as it is made evident by the change from, for example, 10% to 11% as indicated by the choices shown in Table 1 above. By assuming each profile behaves differently from the other, a supervised machine learning model can be created and learned for each different profile. As such, the user behavior can be approximated by learning how a user from a given profile would make a selection, given different available choices. Assuming that we acquired the ability to cast new decisions for new users, mimicking their behavior, a next step would to be able to generate new users in order to exercise the decision models. To accomplish this task, a non-parametrical, sampling based approach can be used based on the latent information provided through an automatic profiling mechanism.

Turning now to user demand estimation based on restricted historical information, given a parking lot with a known infrastructure, we would like to model the following function:

$p(\text{arrival,duration})$

Figure 2:
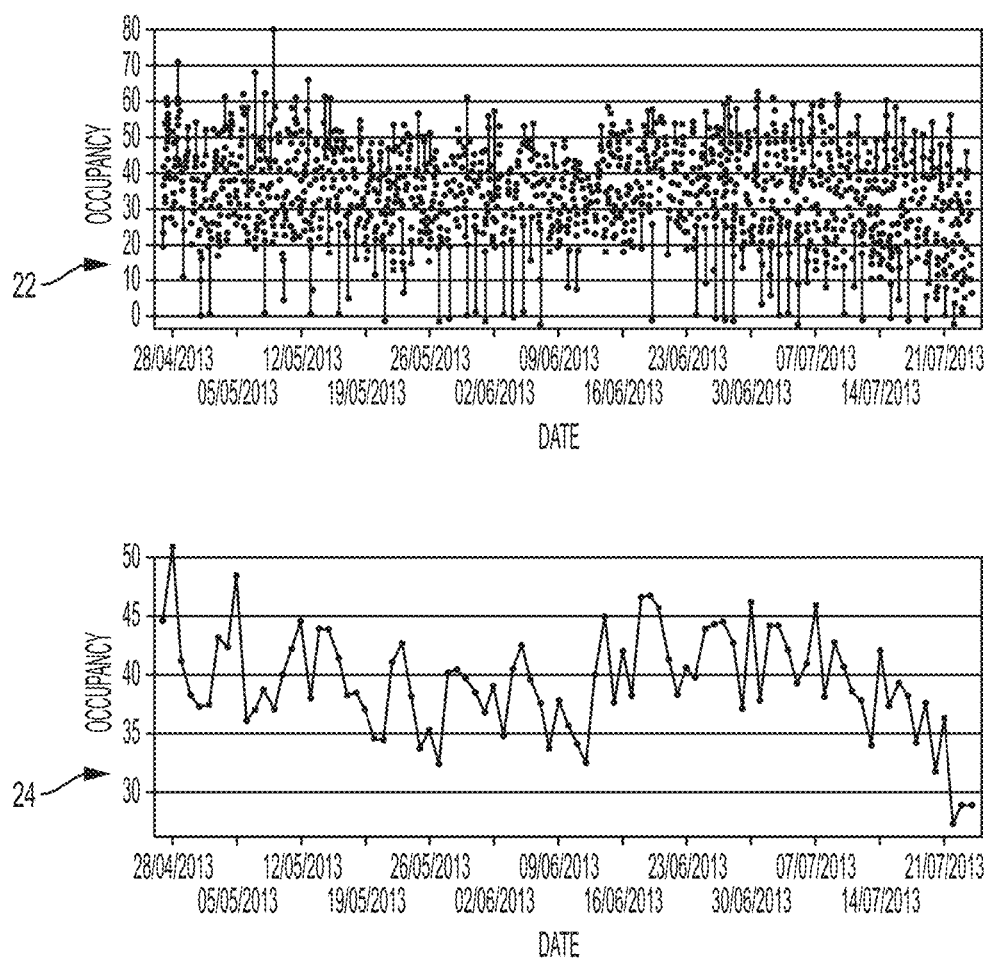
FIG. 2 illustrates example occupancy charts at different granularities, in accordance with an example embodiment.

One example of this distribution can be grasped by analyzing the occupancy of a parking lot. The occupancy is a measure of how occupied a parking lot is and can be represented as a time series segmented on pre-determined granularity, as shown in FIG. 2. That is, FIG. 2 illustrates example occupancy charts 22, 24 at different granularities, in accordance with an example embodiment.

In the disclosed embodiments, the direct distribution p(arrival,duration) can be modeled using a multivariate empirical distribution estimated from multiple same size segments of the data, such as per week, months or years. Instead of using a multivariate empirical distribution, the system can also decompose the probability of a user arriving in a time arrival and staying for duration minutes as:

$p(\text{arrival,duration}) = p(\text{arrival})p(\text{duration}|\text{arrival})$ $p(\text{duration}|\text{arrival}) = p(\text{duration}|\text{day of week}(\text{arrival}))$ This is a fairly simplistic view of the arrival distribution. The modelling capabilities of the above formulations can be augmented, however, by introducing latent variables in the process, as described below.

A fairly reasonable assumption can be made that each user who decides to park his or her car actually wants to park his/her car for a reason. It can be assumed also that this reason may not be unique for each user, but may, in fact, represent a common characteristic of a group of users. It can also be assumed that the intentions and behavior of each parking lot user can actually be labelled into a finite set of user profiles $\Omega$, as in $f(\text{user}) = \omega, \omega \in \Omega$ Now, we assume the probabilities could be decomposed by individual profiles and be expressed as:

$$p(\text{arrival, duration}) = \sum_\Omega p(\text{arrival, duration}|\omega)p(\omega)$$

where p(arrival,duration|ω) can either be modeled directly or could again be assumed to be decomposable as:

$p(\text{arrival,duration}|\omega) = p(\text{arrival}|\omega)p(\text{duration}|\text{arrival},\omega)$ $p(\text{duration}|\text{arrival},\omega) = p(\text{duration}|\text{day of week}(\text{arrival}),\omega)$ Furthermore, it can be assumed that although a user profile ω exists for a given user, this cannot be determined directly (i.e., it would be difficult to ask the user about his or her real intentions); however, we can try to infer it automatically. To accomplish this automatic inference, an unsupervised learning technique can be employed in order to extract behavioral clusters from historical data regarding a parking lot.

Another question that still needs to be answered is how to model the probabilities p(arrival|ω) and p(duration|day of week(arrival), ω). The first issue arises from the fact that those distributions are being defined over dates and time spans. The first step to transform such probabilities into actual distributions is to consider them distributions of relative minutes past since a fixed start date. As such, our problem descends from a date domain to a more familiar real valued domain.

Still, it is not very clear how such distributions can be modeled appropriately. While several parametrical distributions and even distribution mixtures can be tried in the disclosed embodiments, a decision is made to follow along a non-parametric approach. Distributions have been created using empirical distributions, which, according to the Glivenko-Cantelli theorem, converges to the true data distribution as the number of samples increase.

In order to begin experiments using the disclosed approach, several hypotheses can be considered concerning an optimal choice of feature vectors for learning the user choice models. Those hypotheses are listed in Table 2 below.

TABLE 2

Examples of Different Feature Combinations

| Alias | Features |
|---|---|
| Amount paid | Expected total amount to be paid |
| Amount/hour | Expected total amount per hour |
| Baseline | Planed duration of stay (minutes) |
| | Expected total amount |
| | Walking minutes from zone to airport |
| | Maximum advertised minutes for stay |
| | Zone occupancy at arrival in the airport |
| | Zone capacity (total number of slots) |
| Zones | Same features as in base, plus |
| | Occupancy at arrival for each of the zones |
| History | Same features as in base, plus |
| | Prevalence of the zone in the user's profile (%) |
| ZoneHistory | Same features as in base, plus |
| | Occupancy at arrival for each of the zones |
| | Prevalence of the zone in the user's profile (%) |
| Grace | Same features as in base, plus |
| | Grace minutes under the tariff |
| Cover | Same features as in base, plus |
| | Whether the parking zone has a coverture |
| GraceCover | Same features as in base, plus |
| | Grace minutes under the tariff |
| | Whether the parking zone has a coverture |
| CoverHistory | Same features as in base, plus |
| | Grace minutes under the tariff |
| | Prevalence of the zone in the user's profile (%) |
| Complete | Same features as in ZoneHistory, plus |
| | Same features as in GraceCover |

It should be noted that not every combination possibility is included as this is an exponential combinatory problem; the choice of features shown above has been guided by initial experiments realized with the data beforehand, and tuned while the experiments were being made. In other words, such features and combinations are not limiting features of the disclosed embodiments, but are discussed herein for illustrative purposes only and to refer to some experimental embodiments that have been performed.

Regarding logistic regression results, initial results have been obtained by selecting logistic regression as the choice model. In this setting, a logistic regression model was created to approximate the user choices as described in Table 2 above, considering different sets of features. In these experiments, each simulation ran for a period of at least 24 weeks until equilibrium could be attained and results could be gathered. Each experiment has been repeated a total of 25 times.

Tables 3 and 4 below provides data indicative of distances and error measures between the simulated parking events and the real world during the validation period, considering a Hausdorff distance, average difference in number of parkings, and the average difference in generated revenue between parking zones.

TABLE 3

| | Hausdorff distance | Std. Dev. | Average parking events difference | Std. Dev. |
|---|---|---|---|---|
| Amount paid | 3071.31 | 6092.75 | 26630.54 | 850.24 |
| Amount/hour | 4262.06 | 11570.37 | 26484.33 | 1231.67 |
| Baseline | 1838.08 | 836.83 | 7075.26 | 1889.55 |
| Zones | 1606.18 | 825.81 | 7254.49 | 1685.68 |
| History | 1271.96 | 694.94 | 6343.72 | 2944.87 |
| ZoneHistory | 1778.43 | 914.38 | 7251.51 | 2536.41 |
| Grace | 1223.52 | 788.79 | 8787.17 | 2659.18 |
| Cover | 1178.09 | 539.21 | 6681.21 | 2446.06 |
| GraceCover | 1201.79 | 756.91 | 6978.24 | 3671.90 |
| CoverHistory | 1421.01 | 803.35 | 5484.86 | 2186.80 |
| Complete | 1377.40 | 602.00 | 5837.48 | 2954.83 |
| MinPrice | 1281.50 | 931.69 | 21863.94 | 1803.13 |

TABLE 4

| | Revenue difference | Std. Dev | Relative % revenue error | Best zone | Worst zone * |
|---|---|---|---|---|---|
| Amount paid | 204529.82 | 12549.91 | 396.22% | 24.58% | 2083.48% |
| Amount/hour | 203753.82 | 13649.42 | 376.59% | 24.42% | 1955.41% |
| Baseline | 114169.53 | 21965.62 | 130.88% | 13.14% | 463.79% |
| Zones | 124655.46 | 22691.62 | 110.98% | 21.43% | 265.65% |
| History | 85518.01 | 25341.16 | 97.14% | 6.97% | 298.44% |
| ZoneHistory | 86484.51 | 26818.33 | 89.11% | 7.69% | 226.16% |
| Grace | 111105.86 | 11716.45 | 91.27% | 20.37% | 260.30% |
| Cover | 78117.29 | 26131.70 | 89.36% | 5.02% | 251.57% |
| GraceCover | 79430.74 | 26476.48 | 59.88% | 7.15% | 138.11% |
| CoverHistory | 77453.82 | 20209.90 | 91.04% | 8.31% | 258.71% |
| Complete | 73388.61 | 15840.64 | 60.34% | 7.43% | 139.48% |
| MinPrice | 244079.99 | 15023.87 | 209.82% | 12.42% | 226.85% |

Tables 3 and 4 above also includes a final row for a min price model, for comparative reasons. Instead of using a machine learning or statistics based technique to model the user behavior, this module had been manually programmed to always choose the tariff with the best possible price. This is possibly due to the flexible and extensible nature of the simulation system 10 described herein.

In Tables 3 and 4 above, it can also be seen that not all performance metrics were strictly correlated. In particular, the Hausdoff distance, being a worst case metric, does not always coincide with the best revenue approximation in the generated tests. This is mostly visible considering the min price strategy. While this approach resulted in a small Hausdorff distance, its actual performance didn't really fare very well in terms of approximated revenue and number of parking events. An even closer inspection using a mobile analytics platform or tool has also shown the simulation generated by this strategy was not consistent with the original parking characteristics. As such, some embodiments will focus on revenue and occupancy related measures instead.

As can be seen in Tables 3 and 4, logistic regression models involving multiple variables besides only the paid amount presented the best results in terms of revenue approximation, not only in terms of the simulation's distance from the real world data, but also in terms of the reduced variability of the simulation. Keep in mind here that data from previous weeks is being used to approximate what would be the parking behavior in the next four weeks. As such, guaranteeing that the simulation is not producing wildly varying results ensures consistency in any predictions that could be made using the simulation data.

Figure 3:
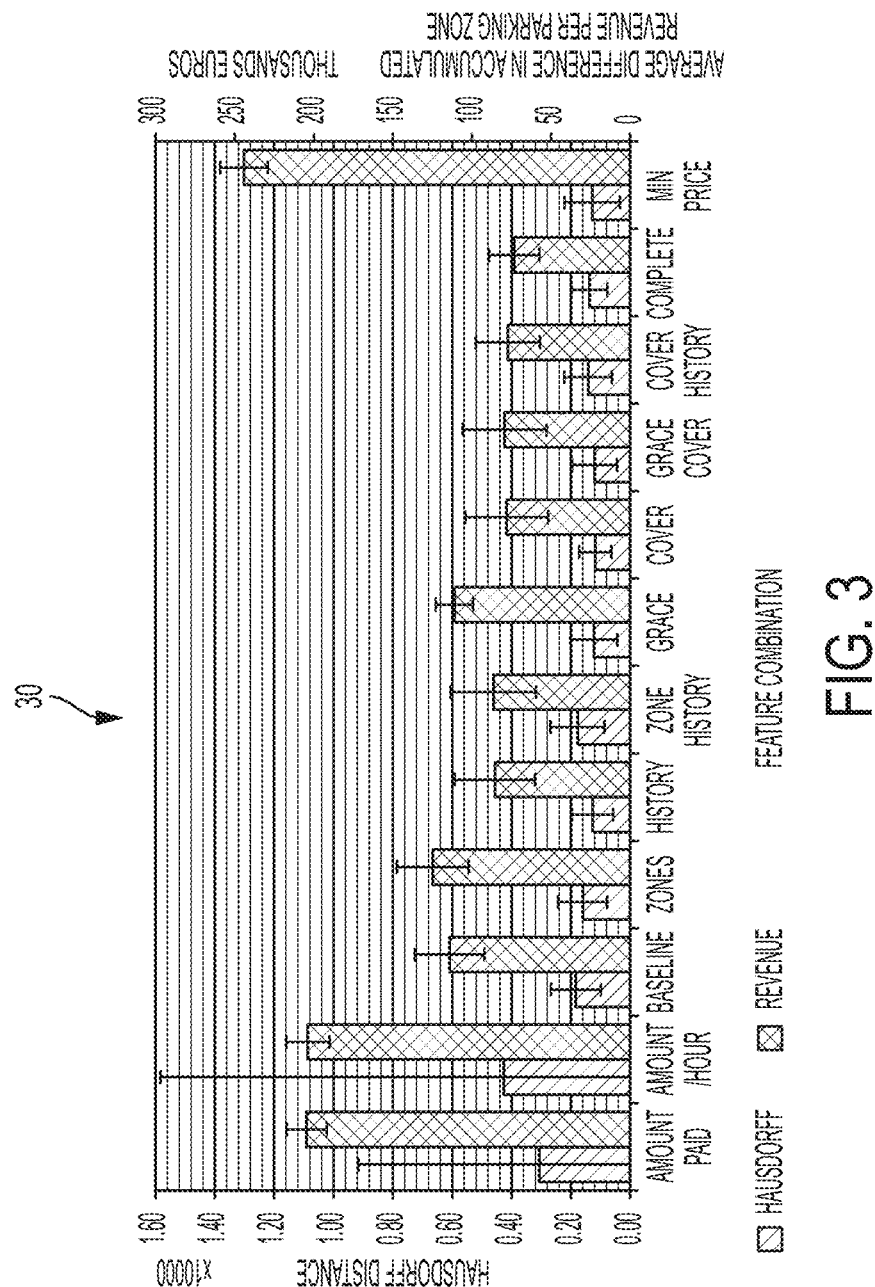
FIG. 3 illustrates a graph depicting distance metrics between simulation and real world data for multiple logistic regression models trained over different sets of features, in accordance with an example embodiment.

FIG. 3 illustrates a graph 30 depicting distance metrics between simulation and real world data for multiple logistic regression models trained over different sets of features, in accordance with an example embodiment. Graph 30 presents the same information from Table 3, but in a graphical format. It is interesting to note that creating a logistic regression that includes only the total amount to be paid is not so far from manually specifying a choice model that always prefers the cheapest option in terms of generated revenue.

The notable difference between models that take only the price into account and the other models indicates that basing a decision solely on the price is clearly sub-optimal, as several other values can interfere with the user choice. In the example above, the use of Walking Distance, Maximum Advertised Minutes, Zone Occupancy at time of entry, perceived zone capacity, and the total intended duration of stay alongside the price rate greatly improves the simulation similarity to the known real world data.

Figure 4A:
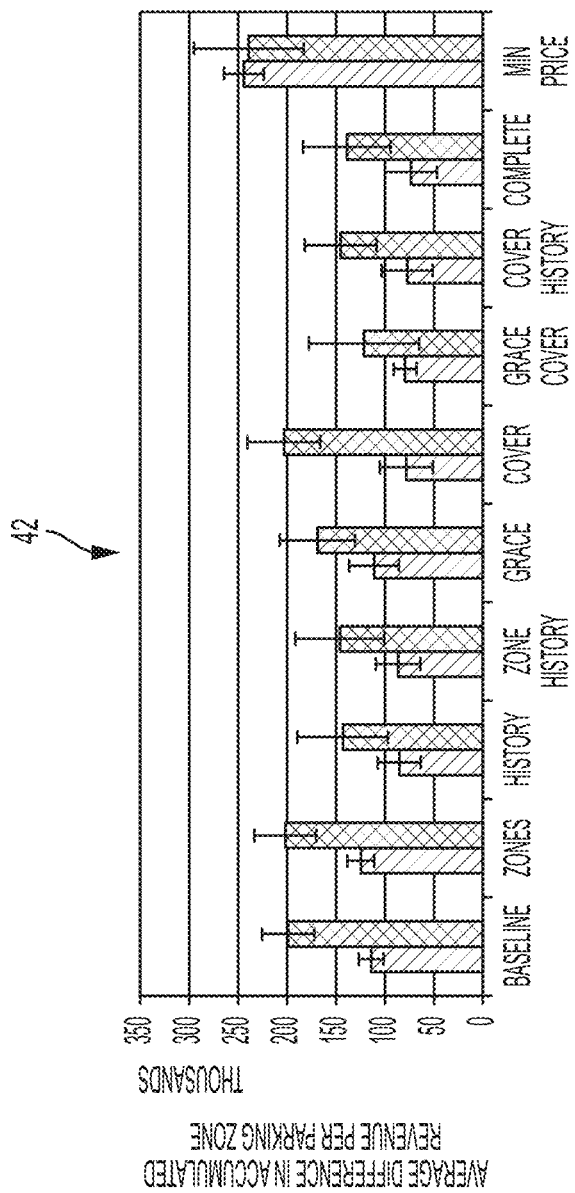
FIGS. 4A-C illustrate graphs depicting quantitative comparisons between real and simulated worlds, with and without incorporating a user profiling mechanism in user demand generation and in user choice learning, in accordance with an example embodiment.
Figure 4B:
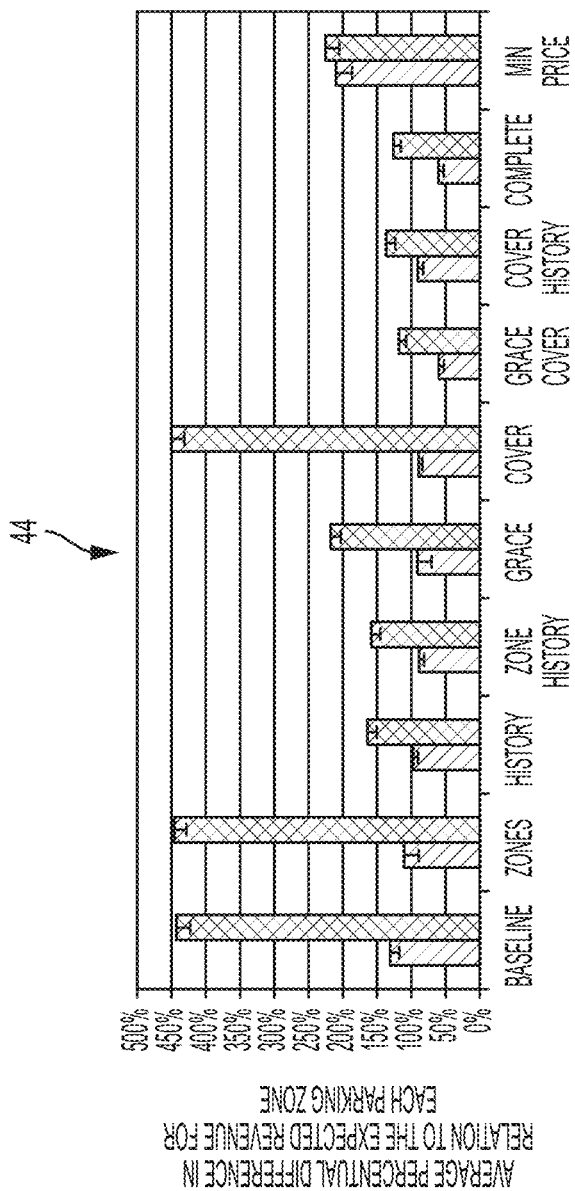
Figure 4C:
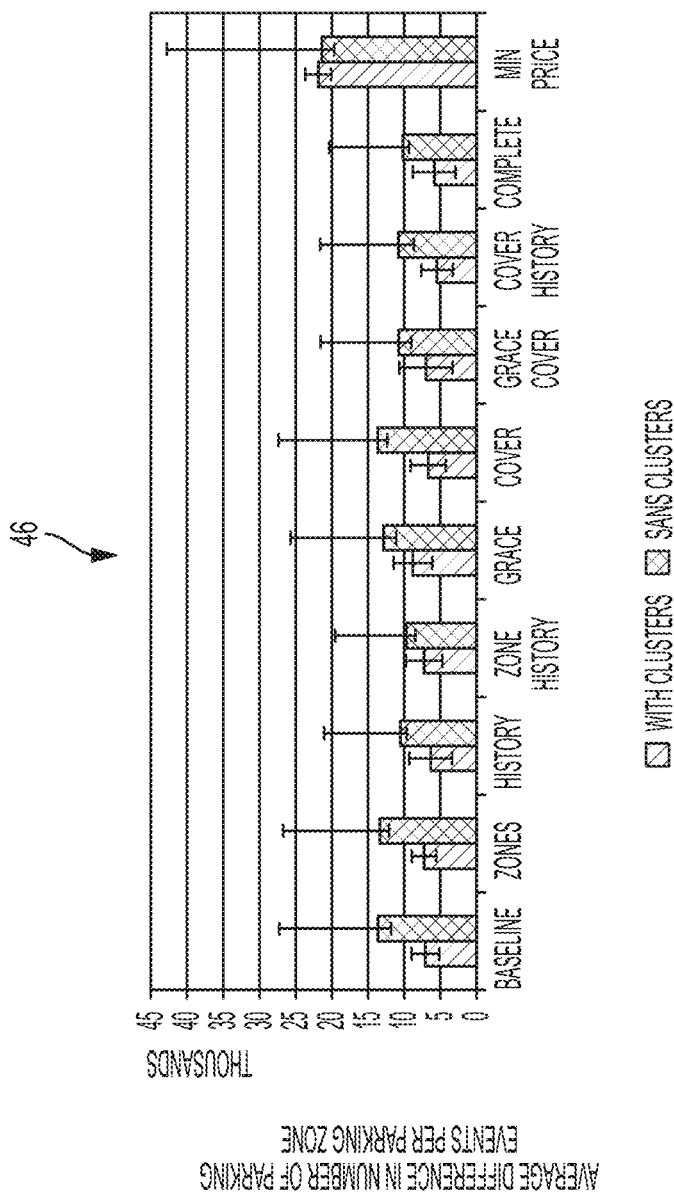

FIGS. 4A-C illustrate graphs 42, 44, and 46 depicting quantitative comparisons between real and simulated worlds, with and without incorporating a user profiling mechanism in user demand generation and in user choice learning, in accordance with an example embodiment. FIGS. 4A-C indicate advantages in incorporating automatic unsupervised profiling. The idea to take user profiles as the base for learning specialized user choice models plays a fundamental role in disclosed system. Graphs 42, 44, 46 demonstrate the difference between considering and not considering the user profiles to model the user demand and learn the user decision functions. FIGS. 4A-C indicate this difference in terms of quantitative metrics.

Figure 5A:
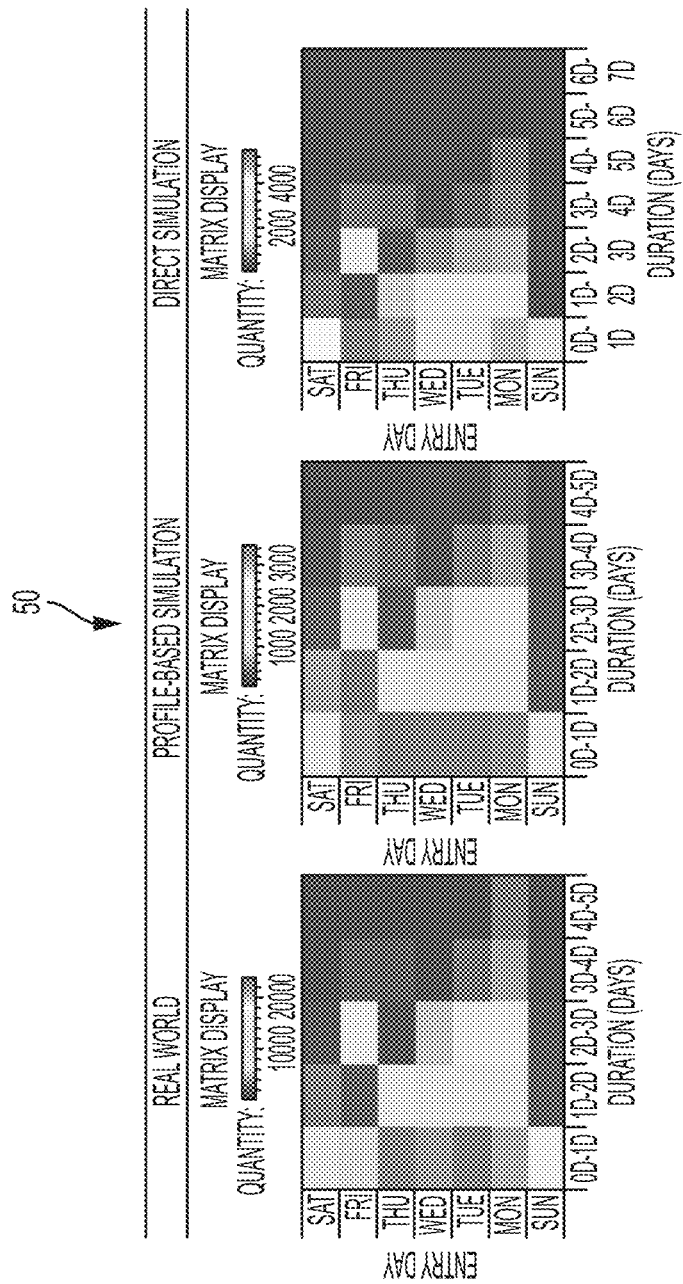
FIGS. 5A-D illustrate a group of graphs depicting qualitative comparisons between real-world and simulation, in accordance with an example embodiment.
Figure 5B:
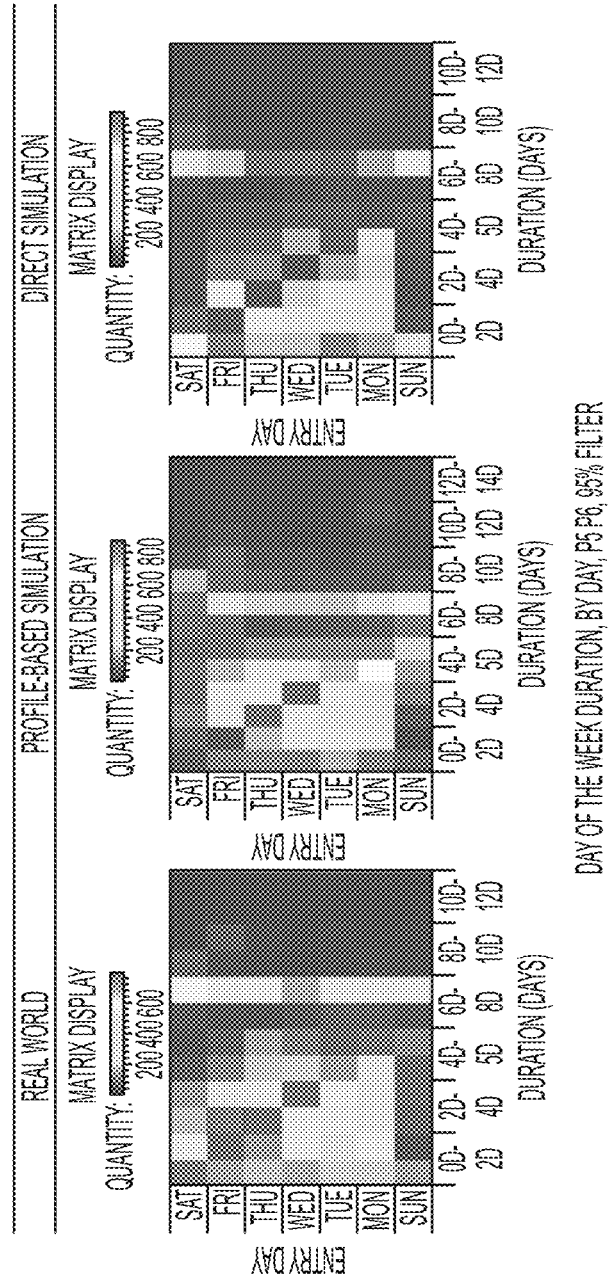
Figure 5C:
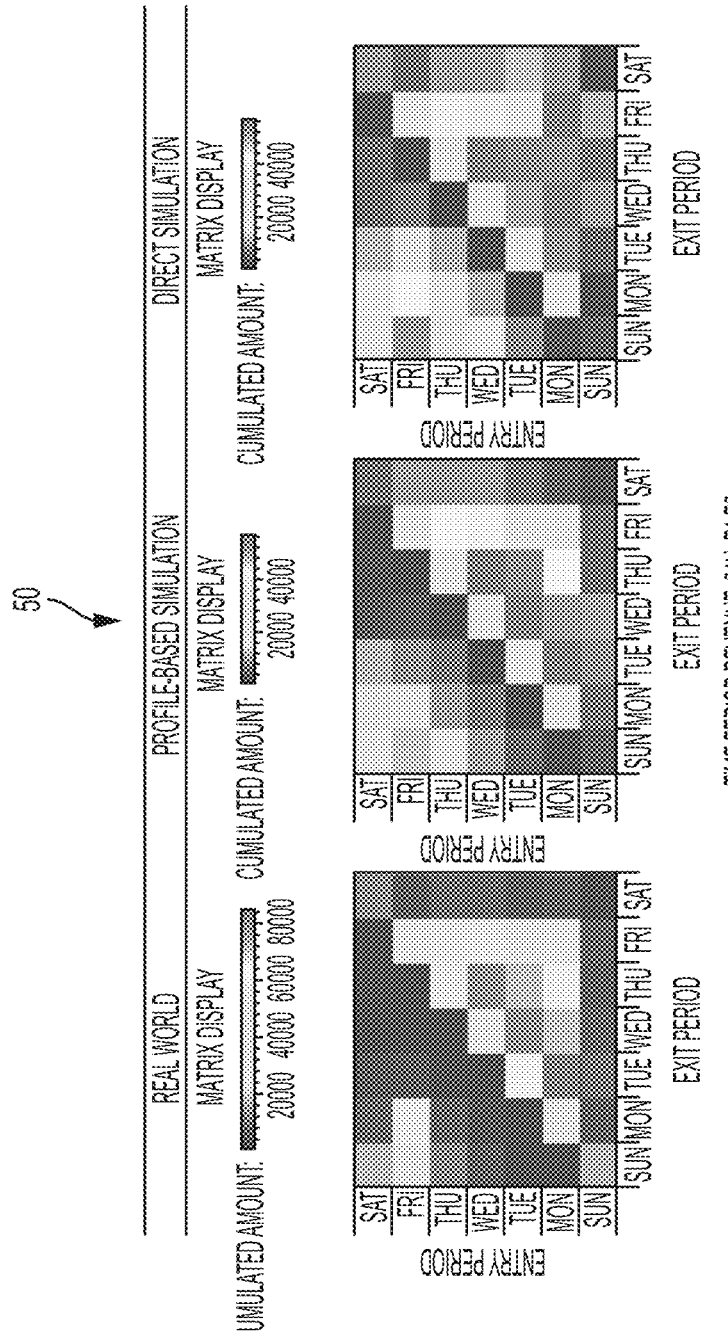
Figure 5D:
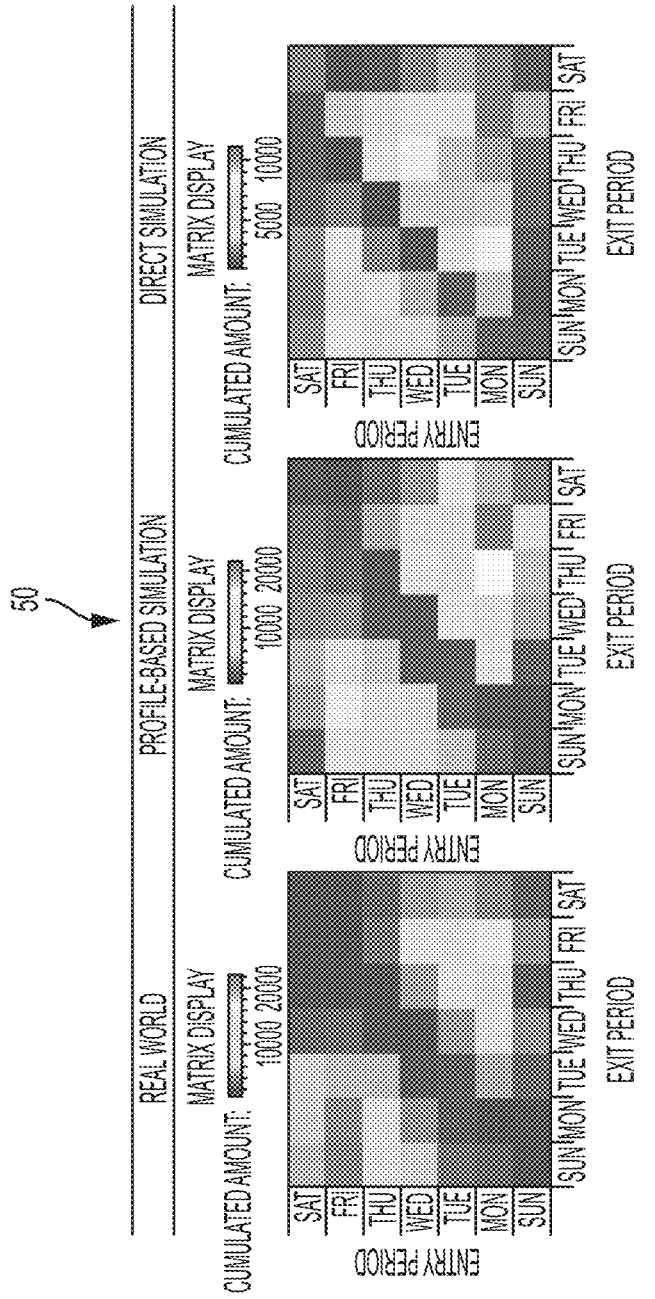

FIGS. 5A-D illustrate a group of graphs 50 depicting qualitative comparisons between real-world and simulation, in accordance with an example embodiment. The graphs 50 shown in FIGS. 5A-D demonstrate how different aspects of the parking data are affected as inspected using visualizations. One interesting characteristics of the simulation done without considering the profiles is the presence of artifacts in the qualitative data, which are particularly visible in the day of the week duration visualization for parking zones P5 and P6 (FIG. 5B). As can be seen, the data not using the profiles shows an inexistent strong band characterizing short-duration stays for those zones, which are clearly not the case in the real world and are not present in the simulation using the profiles.

The disclosed embodiments thus relate to a parking lot simulation system 10. As with other simulators, this system attempts to simulate different user behaviors by assuming some standard groups of users will behave similarly. However, in this system, the groups of users (i.e., user profiles) are learned automatically rather than specified by hand. Those profiles are then used as a key element for automatically learning the decision function of parking users, automatically learning one decision function per profile.

Furthermore, this simulation system works by casting the user-decision problem as a machine learning problem. Such approach enables us to extract inter-zone price elasticity estimations right out from the learning models, as well as detect which features a certain user profile may be more concerned of, which may be crucial in better determining how to tune and optimize both service and revenue for different segments of the parking lot consumers. No previous study or patent had been found detailing such an approach for parking simulation, specifically presenting the same proposed data workflow and system architecture.

Figure 6:
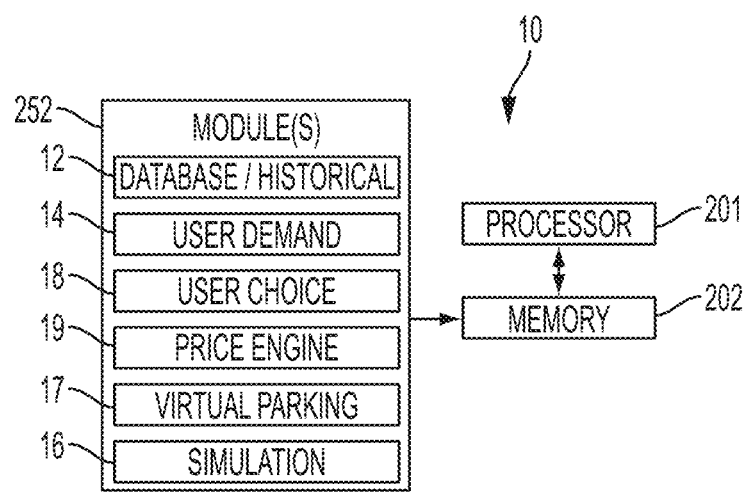
FIG. 6 illustrates a block diagram of a system for simulating users, in accordance with an alternative embodiment.

FIG. 6 illustrates a block diagram of system 10 for simulating users, in accordance with an alternative embodiment. Note that the embodiment of system 10 shown in FIG. 6 is similar to that shown in FIG. 1, albeit with some modifications. For example, the modules 12, 14, 16, 17, 18, and 19 can be stored in memory 202 and retrieved for processing by processor 201. Additional components are described in greater detail herein with respect to FIGS. 7-8.

System 10 can thus be implemented as a simulation system for off-site parking lots related to a point of interest, such as, for example, an airport, hospital, bus or train station, among others, that works through micro-simulation of parking users, and which can be used to predict the results of price rate changes, infrastructure changes, and service changes. Thus, the simulation system 10 described herein can function through discrete event micro-simulation.

Simulation system 10 can be configured such that its internal functionalities are composed of a cooperation of distinct processing modules, each of which can be replaced and tuned independently from each other. Those modules can be incorporated into other products, not necessarily related to simulation. As indicated previously, these modules can include, for example, a Database/Historical data module 12; a User Demand estimation module 14; a User Choice module 18; a Price Engine module 19; a Virtual Parking module 17; and a Simulation module 16.

System 10 divides users into distinct groups that behave similarly in order to provide better predictions about user behavior. However, instead of manually assigning user classes, the user profiles are determined automatically from the historical data using an unsupervised algorithm. Each user profile can be assigned a different choice model and those models are learned from the data using a supervised learning algorithm or module considering different pricing changes in the historical data.

The unsupervised algorithm mentioned above can be replaced by a semi-supervised algorithm into which a few key user profiles can be specified by hand, and data that does not conform to those manually specified profiles can be further separated into different profiles automatically.

The set of choices changes at every event of the discrete simulation. For every user, the set of choices is different, depending on the status of the parking at that particular time. This means the simulation system 10 can cope with tariff changes, tariff cancellations, and the opening of new tariffs during the simulation. Besides historical data, the embodiments can provide subjective data that was available to the user at the time his choice had to be cast. This includes presenting information such as maximum allowed time signs, user instructions, and historical preferences for his particular profile.

As the user choice problem is cast as a machine learning algorithm, many derived measures, such as inter-zone price elasticity can be estimated as part of the learning process after the learning databases have been created. The choice models can be created both in a way that allows for user inspection and interpretation (such as using logistic regression or decision trees) or more robust and black-box models such as support vector machines and neural networks. The learning data can be created by, at each event of the discrete simulation, extracting one positive feature vector for the choice that the user did indeed take and generating one negative feature vector for each choice the user did not take.

Feature vectors can be extracted by running the simulation with the real data and registering the current status of the parking lot at each instant of the discrete event simulation. This differs from just learning from the data as this makes the simulator an active component of the data extraction process. The number and nature of features is operator-configurable, and can encompass any characteristic about the user (e.g., profile, arrival time, intended leave time, etc.), any physical characteristic of the parking lot (e.g., location of parking zones; distances, capacities; etc.), as well as instant information about the parking lot (e.g., individual occupancies for each zone at the time the user entered the parking lot, behavior of people in the past minutes, etc.).

The user demand module 14 can adopt a generative approach which simplifies the task of generating new entries given an initialized demand model. The user demand module 14 is based on a non-parametric decomposition of arrival and duration times for a configurable time period. A time period can encompass any fixed number of weeks, months, or years. Probability distributions for each profile are modelled individually and then combined to form a single probability distribution in which the first component is the cluster probability. Data can then be further separated into small subsets that share a common characteristic (e.g., such as happening in similar days of the week, or in a particular parking zone). Empirical distributions are used, adopting a hybrid parametric (in the sense we manually specify how to obtain those sub-groups of the data) and non-parametric (no specific parametrical distributions are assumed to model the data inside those sub-groups).

The information acquired can then be leveraged in the feature extraction process to teach the different user choice models. Because the simulation system 10 can be set in a manner that does not use any hard information about each particular parking zone, situations can be simulated in which a completely new parking zone is created or an existing zone is closed. The system 10 can be encompassed as a part of an optimization system for some parking lot characteristic: price rates, parking zone changes, internal transport/infrastructure changes. This means the system 10 can be used, for example, to model the impact of opening or closing one parking zone (e.g., such as for assessing the impact of a service interruption).

It is also possible to extract the most important features that guide the user decision in each of the user profiles by using a L1-regularized linear model, such as an L1-regularized logistic regression or L1-support vector machine. It is also possible to use system 10 to estimate inter-zone price elasticity for different user profiles, such as this information can be incorporated into other systems as an additional information about the user profiles.

It should be appreciated that although system 10 can specifically operate in the context of an airport, the same system 10 can be used in any parking lot containing multiple parking zones centered on some point of interest, such as a hospital, a bus or train station, or private parking lots for commercial establishments.

Note that in some embodiments, computer program code for carrying out operations of the disclosed embodiments may be written in an object oriented programming language (e.g., Java, C#, C++, etc.). Such computer program code, however, for carrying out operations of particular embodiments can also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (e.g., through the Internet via an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the various block or blocks, flowcharts, and other architecture illustrated and described herein.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 7:
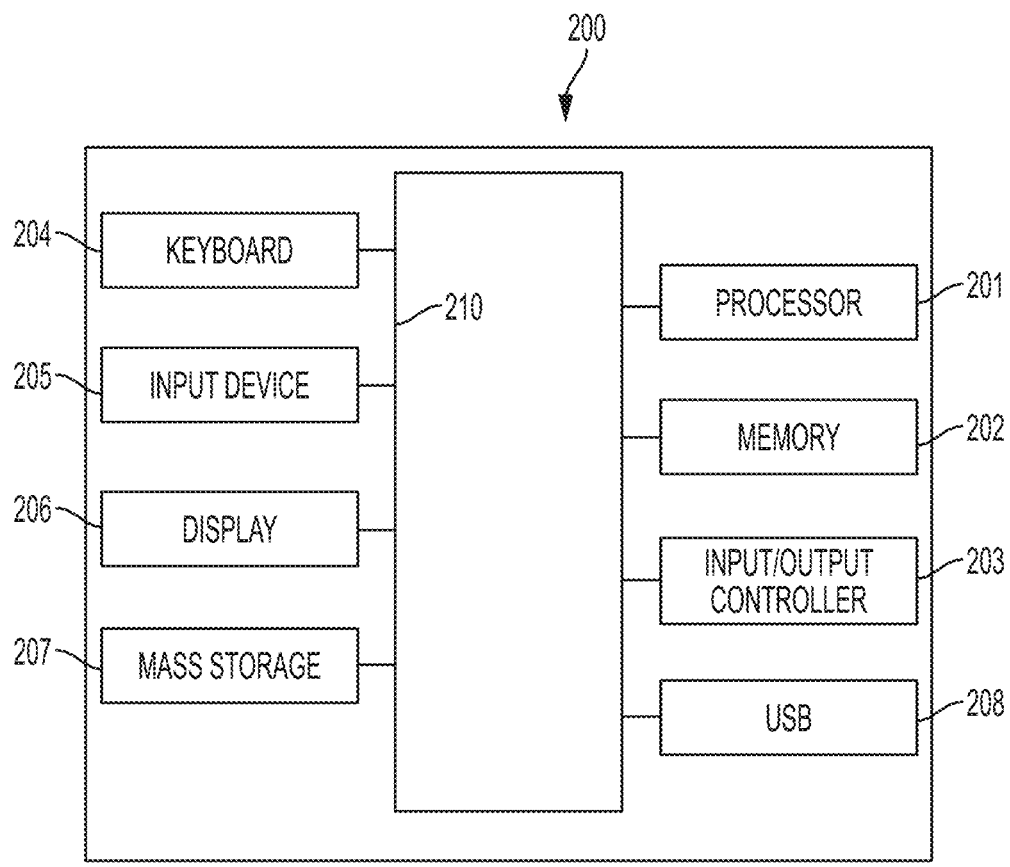
FIG. 7 illustrates a schematic view of a computer system in accordance with an embodiment.
Figure 8:
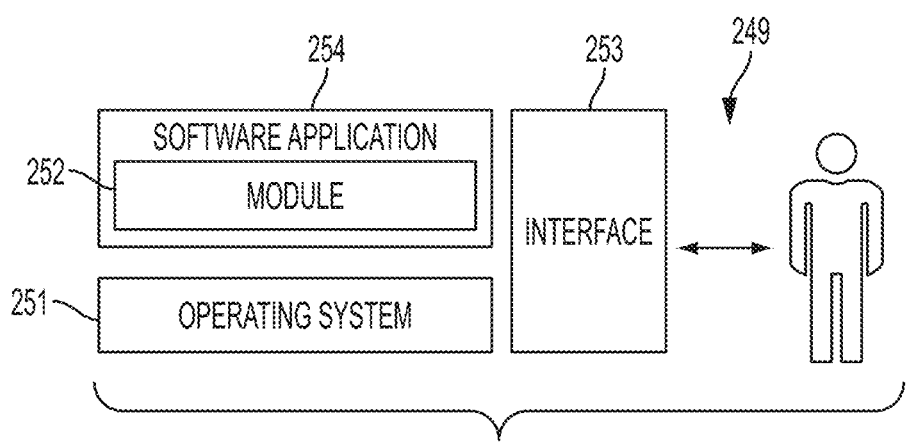
FIG. 8 illustrates a schematic view of a software system including a module, an operating system, and a user interface, in accordance with an embodiment.

FIGS. 7-8 are shown only as exemplary diagrams of data-processing environments in which embodiments may be implemented. It should be appreciated that FIGS. 7-8 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 7, some embodiments may be implemented in the context of a data-processing system 200 that can include one or more processors such as processor 201, a memory 202, an input/output controller 203, a peripheral USB—Universal Serial Bus connection 208, a keyboard 204, an input device 205 (e.g., a pointing device, such as a mouse, track ball, pen device, etc.), a display 206, and in some cases, mass storage 207. Data-processing system 200 may be, for example, a client computing device (e.g., a client PC, laptop, tablet computing device, etc.) which communicates with a print server (not shown) via a client-server network (e.g., wireless and/or wired). In some embodiments, the data-processing system 200 may actually be a print server that communicates with one or more printers (not shown). In some embodiments, system 10 can be modified or adopted for use as or with system 200 discussed herein.

As illustrated, the various components of data-processing system 200 can communicate electronically through a system bus 210 or similar architecture. The system bus 210 may be, for example, a subsystem that transfers data between, for example, computer components within data-processing system 200 or to and from other data-processing devices, components, computers, etc. Data-processing system 200 may be implemented as, for example, a server in a client-server based network (e.g., the Internet) or can be implemented in the context of a client and a server (i.e., where aspects are practiced on the client and the server). Data-processing system 200 may be, for example, a standalone desktop computer, a laptop computer, a Smartphone, a pad computing device, and so on.

FIG. 8 illustrates a computer software system 249 for directing the operation of the data-processing system 200. Software application 254, stored for example in memory 202, generally includes a kernel or operating system 251 and a shell or interface 253. One or more application programs, such as software application 254, may be "loaded" (i.e., transferred from, for example, mass storage 207 or other memory location into the memory 202) for execution by the data-processing system 200. The data-processing system 200 can receive user commands and data through the interface 253. These inputs may then be acted upon by the data-processing system 200 in accordance with instructions from operating system 251 and/or software application 254. The interface 253, in some embodiments, can serve to display results, whereupon a user 249 may supply additional inputs or terminate a session. The software application 254 can include one or more modules such as module 252, which can, for example, implement instructions or operations such as those described herein. For example, as shown in FIG. 6, modules 12, 14, 16, 17, 18, and 19 can be implemented as sub-modules as part of the greater module 252.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application. However, a module may also be composed of, for example, electronic and/or computer hardware or such hardware in combination with software. In some cases, a "module" can also constitute a database and/or electronic hardware and software that interacts with the database.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc.

FIGS. 7-8 are thus intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A system for use in managing an off-street parking lot, comprising:
   at least one user interface; and
   at least one module for micro-simulation of parking users of at least one parking area, wherein said micro-simulation of said parking users of said at least one parking area is used to predict results of price rate changes, infrastructure changes, and service changes with respect to said at least one parking area, wherein said micro-simulation comprises a simulating parking environment that is graphically visualized and accessible through said at least one user interface, wherein said at least one user interface is accessible to edit price grids, invoke and test simulations, and produce outcome reports comparing simulated world data against real-world data.

2. The system of claim 1 wherein said at least one module for said micro-simulation of parking users comprises:
   a database module that stores and maintains historical data for use in said micro-simulation of said parking users of said at least one parking area;
   a user demand module that communicates electronically with said database module, and which estimates when a new parking user among said parking users of said at least one parking area will arrive at said parking lot, wherein said historical data is used to build said user demand module, and wherein said user demand module implements a generative approach for simplifying a task of generating entries with respect to an initialized demand model employed in said micro-simulation of said parking users of said at least one parking area;

a user choice module that estimates a choice in parking that may be made by a parking user among said parking users of said at least one parking area;

a price engine module that communicates electronically with said user choice module and computes how much said parking user will be required to pay if said parking user opts for said choice in parking;

a virtual parking module that provides a virtual parking lot; and a simulation module that communicates electronically with said user demand module and said database, and which builds said virtual parking lot based on said historical data and generated by said user demand module, said user choice module, and said price engine module.

3. The system of claim 2 wherein said at least one module:

optionally divides said parking users into distinct groups that behave similarly so as to provide enhanced predictions regarding behaviors associated with said parking users with respect to said at least one parking area;

wherein each user profile associated with each user among said parking users is assigned a different choice model from among a plurality of choice models learned from historical data and other factors via a supervised learning module.

4. The system of claim 3 wherein said user demand module is based on a non-parametric decomposition of arrival and duration times for a configurable time period that encompasses any fixed number of weeks, months, or years.

5. The system of claim 4 wherein probability distributions describing different features of each user profile associated with said parking users are combined to form a single probability distribution in which a first component comprises a cluster probability.

6. The system of claim 4 wherein said data is leveraged in a feature extraction process to teach different user choice models.

7. The system of claim 2 wherein said user choice model comprises a machine learning algorithm utilizing derived measures estimated as a part of a learning process after learning databases have been created.

8. The system of claim 7 wherein said at least one module additionally employs subjective data available to at least one parking user among said parking users of said at least one parking area at a time a choice is made by said at least one parking user, wherein said subjective data is employed by said at least one module for said micro-simulation of said parking users.

9. The system of claim 2 wherein said micro-simulation comprises a discrete event micro-simulation and said at least one module:

creates learning data: for said micro-simulation of said parking users of said at least one parking area at each event of said discrete event micro-simulation;

extracts a positive feature vector for each choice made by at least one parking user among said parking users of said at least one parking area; and generates a negative feature vector for each choice not made by said at least one parking user among said parking users of said at least one parking area.

10. The system of claim 9 wherein said at least one module extracts a plurality of feature vectors for use in said micro-simulation by running said micro-simulation with real data and registering a current status of said at least one parking area at each instant of said discrete event micro-simulation.

11. A system for use in managing an off-street parking lot, comprising:

at least one processor; and a computer-usable medium embodying computer program code, said computer-usable medium capable of communicating with said at least one processor, said computer program code comprising instructions executable by said at least one processor and configured for:

providing at least one user interface; and generating a micro-simulation of parking users of at least one parking area, wherein said micro-simulation of said parking users of said at least one parking area is used to predict results or price rate changes, infrastructure changes, and service changes with respect to said at least one parking area, said micro-simulation comprises a discrete event micro-simulation, wherein said micro-simulation comprises a simulating parking environment that is graphically visualized and accessible through said at least one user interface, wherein said at least one user interface is accessible to edit price grids, invoke and test simulations, and produce outcome reports comparing simulated world data against real-world data.

12. The system of claim 11 further comprising:

a database module that stores and maintains historical data for use in said micro-simulation of said parking users;

a user demand module that communicates electronically with said database module, and which estimates when a new parking user among said parking users of said at least one parking area will arrive at said parking lot, wherein said historical data is used to build said user demand module, and wherein said user demand module implements a generative approach for simplifying a task of generating entries with respect to an initialized demand model employed in said micro-simulation of said parking users;

a user choice module that estimates a choice in parking that may be made by a parking user among said parking users of said at least one parking area;

a price engine module that communicates electronically with said user choice module and computes how much said parking user of said at least one parking area will be required to pay if said parking user opts for said choice in parking;

a virtual parking module that provides a virtual parking lot; and a simulation module that communicates electronically with said user demand module and said database, and which builds said virtual parking lot based on said historical data and generated by said user demand module, said user choice module, and said price engine module.

13. The system of claim 2 wherein said instructions are further configured for:

optionally dividing said parking users into distinct groups that behave similarly so as to provide enhanced predictions regarding behaviors associated with said parking users of said at least one parking area with respect to said at least one parking area; and wherein each user profile among said user profiles associated with said parking users is assigned a different choice model from among a plurality of choice models learned from said historical data via a supervised learning module that considers different pricing changes in said historical data.

14. The system of claim 13 wherein:
said plurality of choice models are learned from an augmented dataset that has been reconstructed from a database of historical records of said at least one parking area; and
subjective data available to at least one parking user among said parking users at a time a choice is made by said at least one parking user is employed for learning choice models among said plurality of choice models employed in said micro-simulation of said parking users of said at least one parking area.

15. The system of claim 13 wherein said instructions are further configured for extracting the most important features guiding a decision of at least one user among said parking users of said at least one parking area in each of said user profiles utilizing an L1-regularized linear model comprising at least one of 1-regularized logistic regression or an L1-support vector machine.

16. The system of claim 13 wherein said instructions are further configured for:
estimating data indicative of inter-zone price elasticity information for different user profiles among said user profiles; and
incorporating said data into a parking visualization tool.

17. The system of claim 11 wherein said instructions are further configured for:
creating learning data for said micro-simulation of said parking users at each event of said discrete event micro-simulation;
extracting a positive feature vector for each choice made by at least one parking user among said parking users; and
generating a negative feature vector for each choice not made by said at least one parking user among said parking users.

18. A method for managing an off-street parking lot, comprising:
providing at least one user interface:
generating a micro-simulation of parking users of at least one parking area; and
employing said micro-simulation of said parking users of said at least one parking area to predict results of price rate changes, infrastructure changes, and service changes with respect to said at least one parking area, wherein said micro-simulation comprises a simulating parking environment that is graphically visualized and accessible through said at least one user interface, wherein said at least one user interface is accessible to edit price grids, invoke and test simulations, and produce outcome reports comparing simulated world data against real-world data.

19. The method of claim 18 further comprising:
creating learning data for said micro-simulation of said parking users of said at least one parking area at each event of said micro-simulation;
extracting a positive feature vector for each choice made by at least one parking user among said parking users of said at least one parking area; and
generating a negative feature vector for each choice not made by said at least one parking user among said parking users of said at least one parking area.

20. The method of claim 18 further comprising creating said micro-simulation of parking users utilizing:
a database module that stores and maintains historical data for use in said micro-simulation of said parking users;
a user demand module that communicates electronically with said database module, and which estimates when a new parking user among said parking users will arrive at said parking lot, wherein said historical data is used to build said user demand module, and wherein said user demand module implements a generative approach for simplifying a task of generating entries with respect to an initialized demand model employed in said micro-simulation of said parking users;
a user choice module that estimates a choice in parking that may be made by a parking user among said parking users;
a price engine module that communicates electronically with said user choice module and computes how much said parking user will be required to pay if said parking user opts for said choice in parking;
a virtual parking module that provides a virtual parking lot; and
a simulation module that communicates electronically with said user demand module and said database, and which builds said virtual parking lot based on said historical data and generated by said user demand module, said user choice module, and said price engine module.

* * * * *